(12) United States Patent
Cho et al.

(10) Patent No.: US 7,179,560 B2
(45) Date of Patent: Feb. 20, 2007

(54) COMPOSITE ELECTROLYTE MEMBRANE AND FUEL CELL CONTAINING THE SAME

(75) Inventors: Ju-hee Cho, Seoul (KR); Chan-ho Pak, Seoul (KR)

(73) Assignee: Samsung SDI Co., Ltd., Suwon (KR)

( * ) Notice: Subject to any disclaimer, the term of this patent is extended or adjusted under 35 U.S.C. 154(b) by 503 days.

(21) Appl. No.: 10/627,705

(22) Filed: Jul. 28, 2003

(65) Prior Publication Data
US 2005/0175880 A1    Aug. 11, 2005

(30) Foreign Application Priority Data
Feb. 8, 2003    (KR) .................. 10-2003-0008007

(51) Int. Cl.
H01M 8/10 (2006.01)
H01M 6/18 (2006.01)
B01J 49/00 (2006.01)

(52) U.S. Cl. .................. 429/33; 429/46; 429/313; 429/314; 252/62.2; 521/27

(58) Field of Classification Search .......... 429/33, 429/46, 30, 313, 314, 317; 252/62.2; 521/27, 521/28, 30; 428/451, 446, 447, 421, 422
See application file for complete search history.

(56) References Cited

U.S. PATENT DOCUMENTS

| | | | |
|---|---|---|---|
| 3,282,875 A | 11/1966 | Connolly et al. | |
| 4,358,545 A | 11/1982 | Ezzell et al. | |
| 4,940,525 A | 7/1990 | Ezzell et al. | |
| 4,985,315 A | 1/1991 | Lemoine | |
| 5,380,791 A * | 1/1995 | Panster et al. | 524/837 |
| 5,409,785 A | 4/1995 | Nakano et al. | |
| 5,422,411 A | 6/1995 | Wei et al. | |
| 5,672,439 A | 9/1997 | Wilkinson et al. | |
| 5,795,496 A | 8/1998 | Yen et al. | |
| 5,795,668 A | 8/1998 | Banerjee | |
| 5,849,428 A | 12/1998 | Hamlen | |
| 5,919,583 A | 7/1999 | Grot et al. | |
| 5,981,097 A | 11/1999 | Rajendran | |
| 6,054,230 A | 4/2000 | Kato | |
| 6,130,175 A | 10/2000 | Rusch et al. | |
| 6,194,474 B1 | 2/2001 | Kerres et al. | |
| 6,242,122 B1 | 6/2001 | Dohle et al. | |
| 6,510,047 B2 | 1/2003 | Meiners et al. | |
| 2002/0061432 A1* | 5/2002 | Nakano et al. | 429/33 |

FOREIGN PATENT DOCUMENTS

| | | |
|---|---|---|
| JP | 10-69817 | 3/1998 |
| JP | 2002-110200 | 4/2002 |

OTHER PUBLICATIONS

Q.Deng et al.; "Novel Nafion/Ormosil Hybrids via in-situ Sol-Gel Reactions: 2. Probe of Ormosil Phase Nanostructure by Si Solid State NMR Spectroscopy"; Journal of Sol-Gel Science and Technology 7, 1996, pp. 177-190.*
Korean Patent Office Action and English Translation.

* cited by examiner

*Primary Examiner*—Raymond Alejandro
(74) *Attorney, Agent, or Firm*—Buchanan Ingersoll & Rooney PC

(57) ABSTRACT

A composite electrolyte membrane for decreasing the crossover of polar organic fuel and a fuel cell employing the membrane are provided. The composite electrolyte membrane includes a modified silica in which silicon atoms have substituents as represented by formula 1 and formula 2; and an cation exchange group-containing polymer:

Formula 1

$$—R_1—SO_3X$$

Formula 2

$$—R_2—S—S—R_3—$$

wherein, $R_1$ is an alkylene group with 2–7 carbon atoms, X is a hydrogen atom or an alkali metal, $R_2$ and $R_3$ are each independently an alkylene group with 2–7 carbon atoms.

20 Claims, 1 Drawing Sheet

COMPOSITE ELECTROLYTE MEMBRANE AND FUEL CELL CONTAINING THE SAME

BACKGROUND OF THE INVENTION

This application claims the priority of Korean Patent Application No. 2003-8007, filed on Feb. 8, 2003, in the Korean Intellectual Property Office, the disclosure of which is incorporated herein in its entirety by reference.

1. Field of the Invention

The present invention relates to a fuel cell, and more particularly, to a composite electrolyte membrane for a fuel cell and a fuel cell containing the same.

2. Description of the Related Art

Fuel cells are electrochemical devices which generate electrical energy through electrochemical reaction of fuel and oxygen. Because they are not subjected to the thermodynamic limitations of the Carnot cycle, their theoretical power efficiencies are very high. Fuel cells may be used as sources of electric power for industrial, domestic, and automobile driving applications, as well as for electric/electronic products, in particular, portable devices.

Currently known fuel cells are classified into a polymer electrolyte membrane (PEM) type, a phosphoric acid type, a molten carbonate type, and a solid oxide type according to the type of electrolyte used in the cells. If the type of electrolyte is changed, the operation temperature and materials of constitutional elements of a fuel cell are changed.

Fuel cells are also classified into an external reforming type and an internal reforming type according to fuel feeding process. External reforming fuel cells convert fuel into a hydrogen-rich gas using a fuel reformer before the fuel is delivered to an anode. Internal reforming fuel cells, also known as direct fuel cells, allow gaseous or liquid fuel to be fed directly into an anode.

A representative example of direct fuel cells is a direct methanol fuel cell (DMFC). In the direct methanol fuel cell, an aqueous methanol solution is mainly used as fuel and a proton-conducting polymer electrolyte membrane is used as an electrolyte. Because the direct methanol fuel cell removes the need for an external reformer and has excellent fuel handling property, it can more easily overcome the problem of miniaturization than other fuel cells.

Electrochemical reactions involved in the DMFC include an anode reaction for oxidizing fuel and a cathode reaction for reducing protons and oxygen. These reactions are summarized as follows:

Anode reaction: 
Cathode reaction: 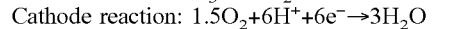
Overall reaction: 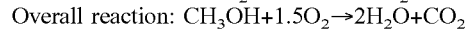

As shown in the above reactions, methanol and water react with each other to produce carbon dioxide, six protons, and six electrons at an anode. The generated protons travel through a polymer electrolyte membrane to a cathode. At the cathode, the protons, electrons from an external circuit, and oxygen react to produce water. Through these reactions, a large portion of the energy corresponding to the heat of combustion of methanol is converted to electrical energy.

The proton conducting polymer electrolyte membrane acts as a channel through which the protons generated by an oxidation reaction at the anode can be transferred to the cathode. At the same time, the polymer electrolyte membrane acts as a separator to separate the anode and the cathode. The polymer electrolyte membrane must have high ionic conductivity to rapidly transport a large amount of protons. In addition, the polymer electrolyte membrane is required to have electrochemical stability, mechanical strength as a separator, thermal stability at an operating temperature, easy thin film formation property to diminish the overall electrolyte resistance for ion conducting, and resistance for swelling by liquid fuel.

A polymer electrolyte membrane is generally made of a perfluorosulfonated polymer called Nafion (a trade name of Dupont). The perfluorosulfonated polymer has a fluorinated alkylene backbone and a sulfonate-terminated, fluorinated vinyl ether side chain. Such a polymer electrolyte membrane is hydrophilic and is ionic conductive in the presence of an appropriate amount of water.

When an aqueous methanol solution as fuel is fed into an anode of a direct methanol fuel cell, unreacted methanol diffuses through a polymer electrolyte membrane to cathode, thereby causing methanol crossover. For that reason, the performance of a fuel cell is significantly decreased. Therefore, reduction of the amount of unreacted methanol is required to decrease the methanol crossover. For this, generally, an aqueous methanol solution with a low concentration of 6 to 16% by weight has been used. However, such an aqueous methanol solution fuel of low concentration reduces the operation efficiency of a fuel cell. In addition, methanol can still permeate a polymer electrolyte membrane, and the poisoning of a cathode catalyst occurs, thereby decreasing the operating life of a fuel cell. These problems may also occur when other polar organic compounds besides methanol are used as fuel.

Therefore, many efforts have been made to decrease the crossover of polar organic fuel such as methanol and ethanol.

U.S. Pat. Nos. 5,409,785; 5,795,668; 6,054,230; 6,242,122; 5,981,097; and 6,130,175 disclose multi-layered electrolyte membranes.

U.S. Pat. Nos. 5,795,496; 6,510,047; and 6,194,474 disclose heat resistance polymer electrolyte membranes.

U.S. Pat. Nos. 5,919,583 and 5,849,428 disclose electrolyte membranes containing inorganic particles for the conduction of protons.

U.S. Pat. No. 4,985,315 discloses an electrolyte membrane containing an amorphous material for the conduction of protons. U.S. Pat. No. 5,672,439 discloses a fuel cell comprising dual catalyst layers.

SUMMARY OF THE INVENTION

The present invention provides a composite electrolyte membrane for decreasing the crossover of polar organic fuel and a fuel cell employing the membrane.

According to an aspect of the present invention, there is provided a composite electrolyte membrane comprising a modified silica in which silicon atoms have substituents as represented by formula 1 and formula 2; and a polymer having a cation exchange group:

  Formula 1

  Formula 2 wherein, $R_1$ is an alkylene group with 2–7 carbon atoms, X is a hydrogen atom or an alkali metal, $R_2$ and $R_3$ are each independently an alkylene group with 2–7 carbon atoms.

According to another aspect of the present invention, there is provided a fuel cell comprising a cathode for reducing an oxidizing agent, an anode for oxidizing fuel, and an electrolyte membrane being placed between the cathode and the anode, the electrolyte membrane being the aforementioned composite electrolyte membrane.

BRIEF DESCRIPTION OF THE DRAWINGS

The above and other features and advantages of the present invention will become more apparent by describing in detail exemplary embodiments thereof with reference to the attached drawing in which.

DETAILED DESCRIPTION OF THE INVENTION

Figure 1:
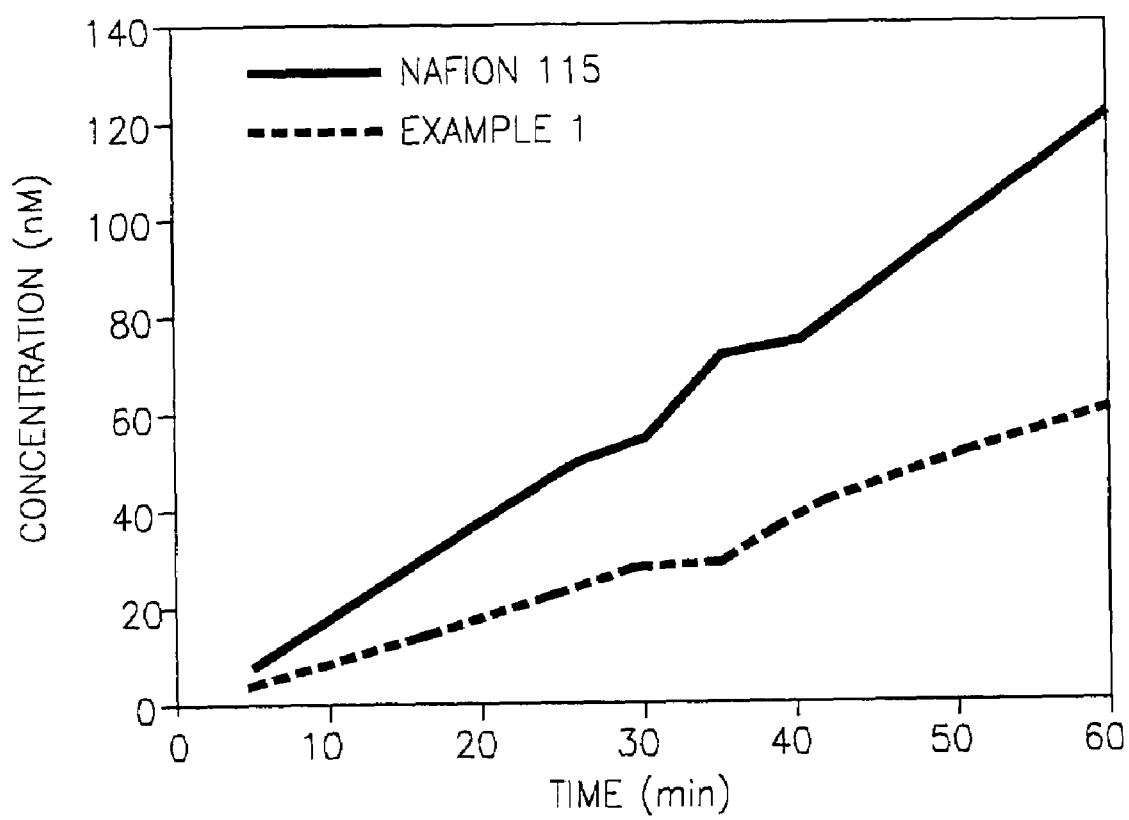
FIG. 1 is a graph showing methanol permeability of the composite electrolyte membrane according to an embodiment of the present invention.

A composite electrolyte membrane of the present invention comprises a modified silica in which silicon atoms have substituents as represented by formula 1 and formula 2; and a polymer having a cation exchange group:

  Formula 1

  Formula 2 wherein, $R_1$ is an alkylene group with 2–7 carbon atoms, X is a hydrogen atom or an alkali metal, $R_2$ and $R_3$ are each independently an alkylene group with 2–7 carbon atoms.

Examples of the alkylene group with 2–7 carbon atoms include —$CH_2$—$CH_2$—, —$CH_2$—$CH_2$—$CH_2$—, —$CH_2$—$CH_2$—$CH_2$—$CH_2$—, —$CH_2$—$CH_2$—$CH_2$—$CH_2$—$CH_2$—, —$CH_2$—$CH_2$—$CH_2$—$CH_2$—$CH_2$—$CH_2$—, and —$CH_2$—$CH_2$—$CH_2$—$CH_2$—$CH_2$—$CH_2$—$CH_2$—, and branched isomers thereof.

The modified silica may be prepared by polymerizing, for example, 3-propyltrimethoxymercaptosilane, 4-butyltrimethoxymercaptosilane, 3-propyltriethoxymercaptosilane, or 4-butyltriethoxymercaptosilane using a hydrolysis method or a sol-gel method, followed by sulfonation.

An example of the modified silica is represented by formula 3:

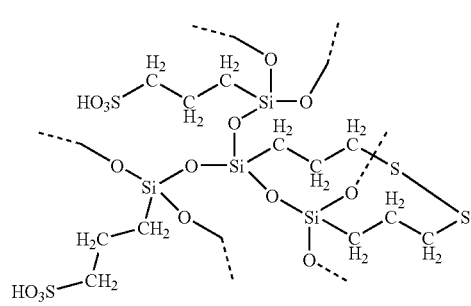

Formula 3

Silicon atoms in the modified silica of formula 3 are connected with each other via an —O— bond in the same manner as in conventional silica except that silicon atoms are bonded with a propane sulfonate group of —$CH_2$—$CH_2$—$CH_2$—$SO_3H$ or a disulfide group of —$CH_2$—$CH_2$—$CH_2$—S—S—$CH_2$—$CH_2$—$CH_2$—. The disulfide group is bonded with two silicon atoms.

The disulfide group acts to prevent the swelling of the electrolyte membrane and the sulfonate group acts to improve ionic conductivity of the electrolyte membrane. In the composite electrolyte membrane of the present invention, because the modified silica mechanically fills pore volumes within polymer matrix and the disulfide bond prevents the swelling of the electrolyte membrane, permeation of polar organic fuel such as methanol into the electrolyte membrane is prevented. Therefore, the composite electrolyte membrane of the present invention can substantially reduce the crossover of a polar organic fuel, such as methanol.

If the ratio of the silicon atom bonded with the sulfonate based substituent of formula 1 is too small in the modified silica, ionic conductivity of the composite electrolyte membrane is excessively reduced. On the other hand, if it is too high, the swelling prevention effect of the composite electrolyte membrane is insufficient. Therefore, it is preferable that the ratio of the silicon atoms bonded with the sulfonate based substituent of formula 1 is in a range of about 10 to about 40% based on the total number of silicon atoms in the modified silica.

If the ratio of the silicon atom bonded with the disulfide based substituent of formula 2 is too small in the modified silica, the swelling prevention effect of the composite electrolyte membrane is insufficient. On the other hand, if it is too high, the composite electrolyte membrane rigidifies and becomes easily broken. In addition, the ionic conductivity of the membrane is reduced. Therefore, it is preferable that the ratio of the silicon atom bonded with the disulfide based substituent of formula 2 is in a range of about 30 to 70% based on the total number of silicon atoms in the modified silica.

If the content of the modified silica in the composite electrolyte membrane is too low, the permeation of a polar organic fuel such as methanol cannot be effectively prevented. On the other hand, if the content of the modified silica is too high, the permeation prevention effect can be saturated. Furthermore, the content of the cation exchange group-containing polymer is relatively reduced, thereby adversely affecting the mechanical strength of the composite electrolyte membrane. Therefore, it is preferable that the content of the modified silica is in a range of about 2 to about 20% by weight.

Because the modified silica mechanically fills micropore volumes within the polymer matrix, it is preferable that the grain size of the modified silica has similar size to the channel of polymer membrane. For example, the grain size of the modified silica may be about 2 to about 10 nm.

The cation exchange group to be used in the cation exchange group-containing polymer may be selected from a sulfonate group, a carboxyl group, a phosphate group, an imide group, a sulfonimide group, a sulfonamide group, and a hydroxyl group.

Examples of the cation exchange group-containing polymer include homopolymers and copolymers of trifluoroethylene, tetrafluoroethylene, styrene-divinyl benzene, $\alpha,\beta,\beta$-trifluorostyrene, styrene, imide, sulfone, phosphazene, etherether ketone, ethylene oxide, polyphenylene sulfide, or aromatic group, and derivatives thereof. These polymers may be used alone or in combination.

Preferably, the cation exchange group-containing polymer may be a highly fluorinated polymer containing fluorine atoms that amount to at least 90% of the total number of fluorine and hydrogen atoms bound to carbon atoms of the backbone and side chains of the polymer.

The cation exchange group-containing polymer may also be a highly fluorinated polymer having a sulfonate group as an cation exchange group on one end of the side chain. In the polymer, fluorine atoms amount to at least 90% of the total number of fluorine and hydrogen atoms bound to carbon atoms of the backbone and side chains of the polymer.

Illustrative examples of the cation exchange group-containing polymer are disclosed in U.S. Pat. Nos. 3,282,875; 4,358,545; 4,940,525, and 5,422,411.

For example, a homopolymer of a $MSO_2CFR_fCF_2O[CFYCF_2O]_nCF=CF_2$ monomer and a copolymer of the a $MSO_2CFR_fCF_2O[CFYCF_2O]_nCF=CF_2$ monomer and at least one monomer selected from ethylene, halogenated ethylene, perfluorinated α-olefin, and perfluoro alkyl vinyl ether may be used as the cation exchange group-containing polymer. In this case, $R_f$ is a radical selected from a fluorine atom and a perfluoroalkyl group with 1–10 carbon atoms, Y is a radical selected from a fluorine atom and a trifluoromethyl group, n is an integer of 1 to 3, and M is a radical selected from a fluorine atom, a hydroxyl group, an amino group, and —OMe group where Me is a radical selected from an alkali metal and a quaternary ammonium group.

A polymer containing a fluorine-substantially substituted carbon backbone and pendant groups of —O—$[CFR'_f]_b$ $[CFR_f]_aSO_3Y$ may also be used as the cation exchange group-containing polymer. In this case, a is 0 to 3, b is 0 to 3, a+b is at least 1, $R_f$ and $R'_f$ are each selected from a halogen atom and a fluorine-substantially substituted alkyl group, and Y is a hydrogen atom or an alkali metal.

A sulfonic fluoro polymer containing a fluorine-substituted carbon backbone and a pendant group of $ZSO_2$— $[CF_2]_a$—$[CFR_f]_b$—O— may also be used as the cation exchange group-containing polymer. In this case, Z is a halogen atom, an alkali metal, a hydrogen atom, or a —OR group where R is an alkyl group with 1–10 carbon atoms or an aryl group, a is 0 to 2, b is 0 to 2, a+b is more than 0, and $R_f$ is selected from F, Cl, a perfluoroalkyl group with 1–10 carbon atoms, and a fluorochloroalkyl group with 1–10 carbon atoms.

Another example of the cation exchange group-containing polymer is a polymer represented by the following formula:

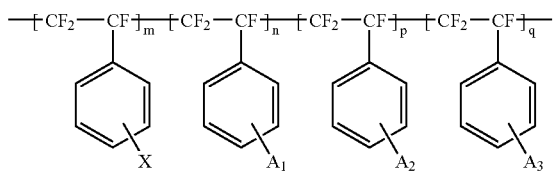

wherein, m is an integer of more than 0; at least one of n, p, and q is an integer of more than 0; $A_1$, $A_2$, and $A_3$ are selected from an alkyl group, a halogen atom, $C_yF_{2y+1}$ (where y is an integer of more than 0), an OR group (where R is selected from an alkyl group, a perfluoroalkyl group, and an aryl group), $CF=CF_2$, CN, $NO_2$, and OH; and X is $SO_3H$, $PO_3H_2$, $CH_2PO_3H_2$, COOH, $OSO_3H$, $OPO_3H_2$, $OArSO_3H$ (where Ar is an aromatic group), $NR_3^+$ (where R is selected from an alkyl group, a perfluoroalkyl group, and an aryl group), $CH_2NR_3^+$ (where R is selected from an alkyl group, a perfluoroalkyl group, and an aryl group).

There are no particular limitations to the thickness of the composite electrolyte membrane of the present invention. However, if the thickness is too thin, the mechanical strength of the membrane is excessively decreased. On the other hand, if the thickness is too thick, the internal resistance of the fuel cell is excessively increased. Therefore, it is preferable that the thickness of the composite electrolyte membrane is within a range of about 30 to about 200 μm.

Hereinafter, illustrative embodiments of fuel cells containing the composite electrolyte membrane of the present invention will be described in detail.

The composite electrolyte membrane of the present invention may be applied to various fuel cells capable of using an electrolyte membrane containing a polymer electrolyte. Illustrative examples of such fuel cells are a polymer electrolyte membrane fuel cell (PEMFC) using a hydrogen-containing gas as fuel and a direct methanol fuel cell using a mixed gas of methanol and water or an aqueous methanol solution as fuel. The composite electrolyte membrane of the present invention may be more advantageously used for a direct methanol fuel cell.

A fuel cell according to the present invention comprises a cathode for reducing oxygen, an anode for oxidizing fuel, and an electrolyte membrane being placed between the cathode and the anode. The aforementioned composite electrolyte membrane is used as the electrolyte membrane.

The cathode comprises a catalyst layer to facilitate the reduction of oxygen. The catalyst layer is made of catalytic particles and an cation exchange group-containing polymer. For example, a carbon supported platinum catalyst, i.e., a Pt/C catalyst, or a Pt black catalyst may be used as a catalyst for the catalyst layer.

The anode comprises a catalyst layer to facilitate the oxidation of fuel such as hydrogen, methanol, and ethanol. The catalyst layer is made of catalytic particles and an cation exchange group-containing polymer. Examples of a catalyst for the catalyst layer include a Pt/C catalyst, a Pt black catalyst, a carbon supported platinum-ruthenium catalyst, i.e., a Pt—Ru/C catalyst and a Pt—Ru black catalyst. In particular, a Pt—Ru/C catalyst or a Pt—Ru black catalyst is useful in a case where organic fuel except for hydrogen is directly fed into the anode.

The catalyst to be used in the cathode and anode may be metal catalyst particles by themselves or a supported catalyst containing metal catalyst particles and a catalyst support. Electroconductive, microporous solid particles such as carbon powders may be used as the catalyst support in the supported catalyst. Examples of the carbon powders include carbon blacks, such as Vulcan, Ketjen black, acetylene black, activated carbon powder, carbon nanofiber powder, and a mixture thereof. The aforementioned polymers may be used as the cation exchange group-containing polymer.

The catalyst layers of the cathode and the anode are in contact with the composite electrolyte membrane.

The cathode and the anode may further comprise a gas diffusion layer. The gas diffusion layer is made of a porous, electroconductive material. The gas diffusion layer acts as an current collector and a channel of reactants and products. The gas diffusion layer may be carbon paper, preferably, a water-repellent carbon paper, and more preferably, a water-repellent carbon black layer-coated, water-repellent carbon paper. The water-repellent carbon paper comprises a hydrophobic polymer such as polytetrafluoroethylene (PTFE). The hydrophobic polymer is present in a state of being sintered. The water-repellency of the gas diffusion layer is to ensure channels both for polar liquid reactants and gaseous reactants. The water-repellent carbon black layer of the water-repellent carbon paper comprises a carbon black and a hydrophobic polymer, such as PTFE, as a hydrophobic binder. The water-repellent carbon black layer is attached on a surface of the water-repellent carbon paper. The hydrophobic polymer in the water-repellent carbon black layer is present in a state of being sintered.

The cathode and the anode may be manufactured by various methods disclosed in many documents, and thus the detailed descriptions thereof are omitted.

Fuel to be fed into the anode of the fuel cell of the present invention may be hydrogen, methanol, or ethanol. Preferably, liquid fuel comprising a polar organic fuel and water may be fed to the anode. Examples of the polar organic fuel include methanol and ethanol.

An aqueous methanol solution is more preferable as the liquid fuel. Because the fuel cell of the present invention can substantially reduce the crossover of polar organic fuel due to use of the nanocomposite electrolyte membrane, a high concentration of an aqueous methanol solution may be used. This is in contrast to a conventional direct methanol fuel cell using an aqueous methanol solution with low concentration of 6 to 16% by weight due to the methanol crossover. In the case of using a low concentration of an aqueous methanol solution in the fuel cell of the present invention, the nanocomposite electrolyte membrane can further reduce the crossover of polar organic fuel. Therefore, the fuel cell of the present invention has improved operation life and efficiency.

Hereinafter, a method for manufacturing the composite electrolyte membrane of the present invention will be described in more detail with reference to an example. An in-situ method for forming modified silica in a previously prepared polymer electrolyte membrane was used in the following example.

EXAMPLE 1

Preparation of Nafion Membrane

Nafion, which is commercially available from Dupont, is a trade name of a perfluorosulfonated polymer or an electrolyte membrane made of the polymer. The Nafion membrane as used in this example was Nafion 115. The Nafion membrane was dried in a vacuum oven at 120° C. for 12 hours. The dried Nafion membrane was fixed in a membrane kit.

Preparation of Composite Electrolyte Membrane

Water of about 30° C. was circulated through a water jacket in a reactor. The upper side of the reactor was connected to a condenser. Water of about 5° C. was circulated through the condenser using a cooling circulator.

9.522 g of n-Hexanol and 1.553 g of sodium dioctylsulfosuccinate were added to the reactor. Sodium dioctylsulfosuccinate was dissolved in n-hexanol while stirring. Then, 100 g of cyclohexane was further added to the reactor.

The Nafion membrane fixed in the membrane kit was inserted into the solution in the reactor. Then, 2 ml of aqueous ammonia solution was further added to the reactor. A whitish precipitate was formed.

After about 30 minutes, 2.358 g of 3-propyltrimethoxymercaptosilane was slowly added.

After about 96 hours, the Nafion membrane was subjected to washing with ethanol, vacuum drying at 100° C. for one hour, washing with acetone, and vacuum drying at 100° C. for one hour in sequence.

The washed and dried Nafion membrane was immersed in a 1M solution of aqueous $H_2SO_4$ and heated at 100° C. for one hour. Then, the Nafion membrane was washed with distilled water and vacuum dried at 100° C. for one hour to prepare a composite electrolyte membrane.

Meanwhile, the ratio of a disulfide group to a sulfonate group that is bonded to a silicon atom can be adjusted by varying the concentration, temperature, and treatment time of an aqueous $H_2SO_4$ solution. As the concentration, temperature, and treatment time of an aqueous $H_2SO_4$ solution increase, the ratio of the sulfonate group increases.

Evaluation of Characteristics of Composite Electrolyte Membrane

The content of the modified silica in the composite electrolyte membrane of Example 1, which was measured by ICP, was 3% by weight. The degree of substitution of the disulfide group in the modified silica was 54% and the degree of substitution of the sulfonate group was 20%, as measured by XPS. The ionic conductivity of each composite electrolyte membrane of Example 1 and Nafion 115 was measured by a four probe method, and the results are presented in Table 1.

TABLE 1

| Sample | Ionic conductivity (S/cm) | | |
|---|---|---|---|
|  | 30° C. | 50° C. | 75° C. |
| Example 1 | 0.12 | 0.16 | 0.21 |
| Nafion 115 | 0.14 | 0.18 | 0.23 |

As shown in Table 1, the ionic conductivity of the composite electrolyte membrane of Example 1 was almost the same as that of Nafion 115. The composite electrolyte membrane of Example 1 exhibited ionic conductivity suitable for use in a fuel cell.

The methanol permeability of the composite electrolyte membrane of Example 1 and Nafion 115 was measured, and the results are presented in FIG. 1. The diffusion coefficient of methanol using a 1M solution of aqueous methanol in a diffusion chamber was measured to determine the methanol permeability. As shown in FIG. 1, the methanol permeability of the composite electrolyte membrane of Example 1 was reduced by about 50%, as compared to the Nafion 115. Therefore, it can be seen that the composite electrolyte membrane of Example 1 was enhanced in terms of reduction in methanol permeability.

As apparent from the above description, the composite electrolyte membrane of the present invention decreases the permeation of polar organic fuel and has appropriate ionic conductivity. When the composite electrolyte membrane of the present invention is used in a direct methanol fuel cell, methanol crossover is decreased, thereby increasing the operation efficiency and life of a fuel cell.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A composite electrolyte membrane comprising a modified silica in which silicon atoms have substituents as represented by formula 1 and formula 2; and a cation exchange group-containing polymer:

—$R_1$—$SO_3$X                     Formula 1

—$R_2$—S—S—$R_3$—                     Formula 2 wherein, $R_1$ is an alkylene group with 2–7 carbon atoms, X is a hydrogen atom or an alkali metal, $R_2$ and $R_3$ are each independently an alkylene group with 2–7 carbon atoms.

2. The composite electrolyte membrane according to claim 1, wherein the content of the modified silica is 2 to 20% by weight.

3. The composite electrolyte membrane according to claim 1, wherein the modified silica has a grain size of about 2 to about 10 nm.

4. The composite electrolyte membrane according to claim 1, wherein the cation exchange group in the polymer is selected from a sulfonate group, a carboxyl group, a phosphate group, an imide group, a sulfonimide group, and a sulfonamide group.

5. The composite electrolyte membrane according to claim 1, wherein the cation exchange group-containing polymer is a highly fluorinated polymer which has a sulfonate group as a cation exchange group on one end of a side chain, and in which fluorine atoms amount to at least 90% of a total number of fluorine and hydrogen atoms bound to carbon atoms of backbone and side chains of the polymer.

6. The composite electrolyte according to claim 1, wherein Formula 1 is

—CH$_2$—CH$_2$—CH$_2$—SO$_3$H, and wherein Formula 2 is

—CH$_2$—CH$_2$—Ch$_2$—S—S—CH$_2$—CH$_2$—CH$_2$—.

7. The composite electrolyte membrane according to claim 1, wherein the sulfonate group of formula 1 acts to improve ionic conductivity of the electrolyte membrane and the disulfide group of formula 2 acts to prevent the swelling of the electrolyte membrane.

8. A fuel cell comprising a cathode; an anode; and an electrolyte membrane being placed between the cathode and the anode,
the electrolyte membrane being a composite electrolyte membrane comprising a modified silica in which silicon atoms have substituents as represented by formula 1 and formula 2; and a cation exchange group-containing polymer:

—R$_1$—SO$_3$X     Formula 1

—R$_2$—S—S—R$_3$—     Formula 2 wherein, R$_1$ is an alkylene group with 2–7 carbon atoms, X is a hydrogen atom or an alkali metal, R$_2$ and R$_3$ are each independently and alkylene group with 2–7 carbon atoms.

9. The fuel cell according to claim 8, wherein the content of the modified silica is 2 to 20% by weight.

10. The fuel cell according to claim 8, wherein the modified silica has a grain size of about 2 to about 10 nm.

11. The fuel cell according to claim 8, wherein the cation exchange group in the polymer is selected from a sulfonate group, a carboxyl group, a phosphate group, an imide group, a sulfonimide group, and a sulfonamide group.

12. The fuel cell according to claim 8, wherein the cation exchange group-containing polymer is a highly fluorinated polymer which has a sulfonate group as a cation exchange group on one end of a side chain, and in which fluorine atoms amount to at least 90% of a total number of fluorine and hydrogen atoms bound to carbon atoms of backbone and side chains of the polymer.

13. The fuel cell according to claim 8, wherein Formula 1 is

—Ch$_2$—Ch$_2$—Ch$_2$—SO$_3$H, and wherein Formula 2 is

—Ch$_2$—Ch$_2$—Ch$_2$—S—S—Ch$_2$—Ch$_2$—Ch$_2$—.

14. A fuel cell comprising:
a cathode;
an anode; and
a composite electrolyte membrane comprising:
a cation exchange polymer; and
a modified silica, wherein the modified silica comprises silicon atoms bonded to a propane sulfonates group and a disulfide group.

15. The fuel cell according to claim 14, wherein the modified silica comprises silicon atoms bonded to a propane sulfonates group on one side of the modified silica and a disulfide group on another side of the modified silica.

16. The fuel cell according to claim 14, wherein the propane sulfonates group is represented by Formula 1 and the disulfide group is represented by Formula 2:

—R$_1$—SO$_3$X     Formula 1

—R$_2$—S—S—R$_3$     Formula 2 wherein R$_1$ is an alkylene group with 3 carbon atoms, X is a hydrogen atom or an alkali metal, R$_2$ and R$_3$ are each independently an alkylene group with 2–7 carbon atoms.

17. The fuel cell according to claim 14, wherein the propane sulfonates group is represented by Formula 1 and the disulfide group is represented by Formula 2:

—Ch$_2$—Ch$_2$—Ch$_2$—SO$_3$H     Formula 1

—Ch$_2$—Ch$_2$—Ch$_2$—S—S —Ch$_2$—Ch$_2$—Ch$_2$—     Formula 2.

18. The fuel cell according to claim 14, wherein the cation exchange group in the polymer is selected from a sulfonate group, a carboxyl group, a phosphate group, an imide group, a sulfonimide group, and a sulfonamide group.

19. The fuel cell according to claim 14, wherein the cation exchange group-containing polymer is a highly fluorinated polymer which has a sulfonate group as a cation exchange group on one end of the side chain, and in which fluorine atoms amount to at least 90% of the total number of fluorine and hydrogen atoms bound to carbon atoms of backbone and side chains of the polymer.

20. The fuel cell according to claim 14, wherein the composite electrolyte membrane comprises about 2 wt% to about 20 wt% modified silica.

* * * * *